(12) United States Patent
Henneken et al.

(10) Patent No.: US 7,090,616 B2
(45) Date of Patent: *Aug. 15, 2006

(54) KICK-DOWN SWITCHING SPEED OPTIMIZATION FOR AN AUTOMATIC TRANSMISSION OF A MOTOR VEHICLE

(75) Inventors: Markus Henneken, Kressbronn (DE); Friedemann Jauch, Meckenbeuren (DE); Kai-Uwe Herbster, Friedrichshafen (DE); Franz-Josef Schuler, Kressbronn (DE); Thomas Mauz, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 113 days.

This patent is subject to a terminal disclaimer.

(21) Appl. No.: 10/782,046

(22) Filed: Feb. 19, 2004

(65) Prior Publication Data

US 2004/0162659 A1    Aug. 19, 2004

Related U.S. Application Data

(62) Division of application No. 10/129,223, filed as application No. PCT/EP00/12637 on Dec. 13, 2000, now Pat. No. 6,773,373.

(30) Foreign Application Priority Data

Dec. 22, 1999  (DE) ............................. 199 61 979

(51) Int. Cl.
*F16H 59/60*  (2006.01)
*B60W 10/04*  (2006.01)
*G06F 17/00*  (2006.01)

(52) U.S. Cl. .................. 477/97; 477/107; 477/901; 701/55

(58) Field of Classification Search ............. 477/107, 477/110, 97, 98, 901, 904; 701/55, 56
See application file for complete search history.

(56) References Cited

U.S. PATENT DOCUMENTS

| 4,254,671 A | * | 3/1981 | Sauer et al. ................. 477/121 |
| 4,501,171 A | * | 2/1985 | Muller et al. ................ 477/139 |
| 4,829,434 A | * | 5/1989 | Karmel et al. ................ 477/98 |
| 5,157,991 A | | 10/1992 | Sumimoto |
| 5,172,609 A | * | 12/1992 | Nitz et al. ..................... 477/97 |
| 5,233,889 A | * | 8/1993 | Iizuka ........................ 477/154 |
| 5,245,893 A | | 9/1993 | Koenig et al. |
| 5,531,654 A | | 7/1996 | Ishikawa et al. |
| 5,772,556 A | | 6/1998 | Tinschert et al. |
| 6,019,701 A | | 2/2000 | Mori et al. |
| 6,098,002 A | | 8/2000 | Horiguchi et al. |
| 6,226,584 B1 | * | 5/2001 | Carlson ...................... 701/55 |
| 6,246,942 B1 | * | 6/2001 | Dobler et al. ................ 701/51 |
| 6,275,760 B1 | | 8/2001 | Saito et al. |
| 6,375,597 B1 | * | 4/2002 | Popp et al. ................... 477/97 |

FOREIGN PATENT DOCUMENTS

| DE | 27 09 235 | 9/1978 |
| DE | 31 39 838 A1 | 4/1983 |
| DE | 44 40 706 A1 | 5/1996 |
| DE | 42 16 553 C2 | 11/1997 |
| DE | 198 31 293 A1 | 1/2000 |

* cited by examiner

Primary Examiner—Roger Pang

(57) ABSTRACT

In the method for kick-down switching speed optimization in a motor vehicle with an automatic transmission, the kick-down upshift point is determined as a function of the load conditions and the road inclination in each case.

10 Claims, 2 Drawing Sheets

KICK-DOWN SWITCHING SPEED OPTIMIZATION FOR AN AUTOMATIC TRANSMISSION OF A MOTOR VEHICLE

FIELD OF THE INVENTION

This application is a divisional of Ser. No. 10/129,223 filed May 1, 2002, which is a national stage completion of PCT/EP00/12637 filed Dec. 12, 2000, which claims priority from German Application No. 199 61 979.4 filed Dec. 22, 1999. A method for kick-down switching speed optimization in a motor vehicle with an automatic transmission.

BACKGROUND OF THE INVENTION

For changing gear in an automatic transmission a certain delay time is allowed for before the switching is completed. During this, the engine speed increases until the load is taken up by the coupling being engaged from the coupling being disengaged. The reasons for the delay time are clutch filling times and ramp times until the switching pressure required for the change has been built up.

In vehicles with powerful engines the engine speed difference that occurs, having regard to the clutch filling times including the load take-up, can be as much as about 1200 r/min.

The maximum attainable engine speed in kick-down upshift gear changes can therefore assume various values which are affected by the load condition of the vehicle and the road inclination.

The problem arises that in an unladen vehicle moving downhill, kick-down (KD) upshifts take place in the range of the engine cut-off speed, i.e. the maximum permissible engine speed. The reason for this is the negative driving resistance, by which the vehicle is additionally accelerated.

In such a case the kick-down upshift must take place and adjusted earlier, i.e. at lower output speed. In the loaded condition and driving uphill, in contrast, the KD switching speed is lower as a result.

Accordingly, the optimum condition, namely equal KD switching speed for any kick-down upshift, cannot be achieved.

In the prior art kick-down shifts are triggered when predetermined output speeds are exceeded. These output speed thresholds can be stored in switching programs or be defined as discrete parameters.

The purpose of the present invention, starting from the aforesaid prior art, is therefore to provide a method for kick-down switching speed optimization in a motor vehicle with an automatic transmission, such that in kick-down upshifts the engine is prevented from exceeding the maximum permissible speed. In addition, premature upshifting is to be prevented.

SUMMARY OF THE INVENTION

Accordingly, it is proposed to determine the kick-down upshift point adaptively, i.e. as a function of the respective load conditions and road inclinations, so that switching takes place at a desired maximum engine speed.

According to the invention, when a kick-down condition is detected by the transmission control system, a speed offset $nd_{13}$ abkd is added to the current upshift point. This speed offset is of appropriate sign and is stored in the transmission control system in the form of a characteristic line, a separate characteristic line being stored for each upshift.

According to a variant of this invention, when a kick-down condition has been recognized the target gear of the next upshift and the transmission output speed gradient are determined.

Thereafter, the speed offset $nd_{13}$ abkd is calculated. For this purpose the delay times for the individual gear shifts are stored for application.

In an advantageous variant, the value of the speed offset is determined in the form of a characteristic line in accordance with both of the above methods and then recalculated as a function of the driver's activity (for example, by means of a valuation counter), so that n_abkd will be higher in a KD-upshift by a sporty driver than in the case of a more sparing driver.

According to this variant, the characteristic line is multiplied by a factor that characterizes the driver's activity as a function of the gear change and output speed gradient. In this case the characteristic line always gives positive values. Alternatively, different characteristic lines are established for various characteristic driver behaviors (again as a function of the gear change and output speed gradient). By averaging between the driver types, intermediate types of drivers can be allowed for.

BRIEF DESCRIPTION OF THE DRAWING

Below, the invention is explained in greater detail with reference to the figures, which show.

DETAILED DESCRIPTION OF THE INVENTION

Figure 1:
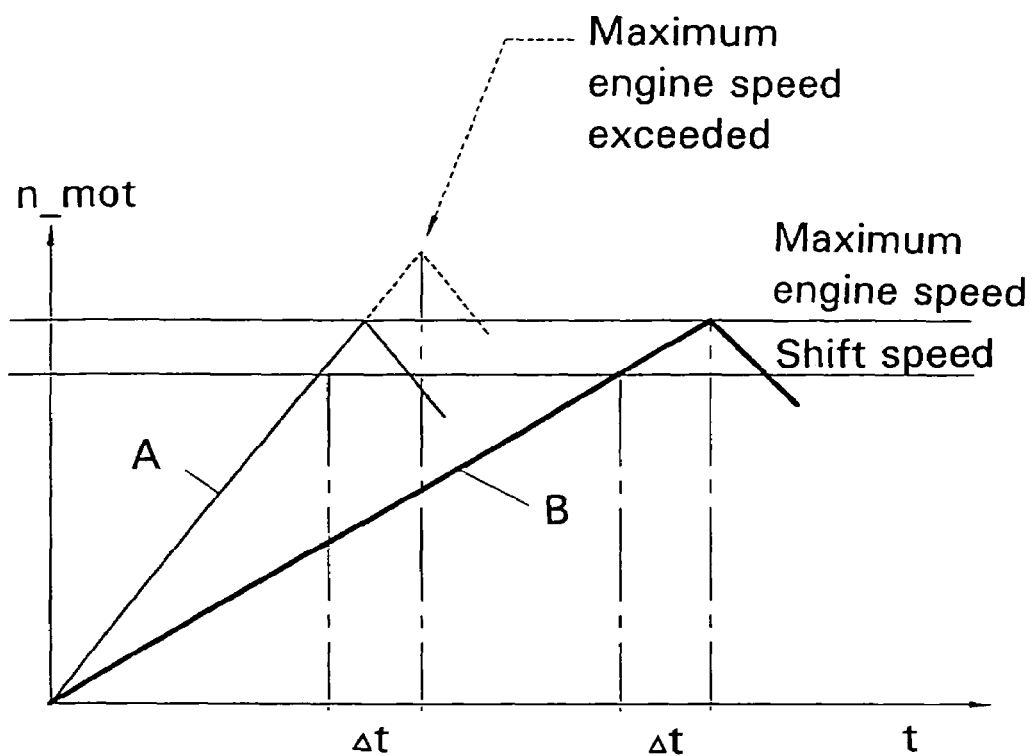
FIG. 1 is a time-engine speed (n_mot-t-) diagram, which illustrates the problem upon which the invention is based.

As illustrated in FIG. 1, when a gear shift is triggered by reaching a certain predetermined switching speed, the delay time $\Delta t$ for the gear change can be longer than the time remaining before the maximum permissible engine speed is reached. This is particularly the case when driving downhill, when because of the negative road inclination the vehicle is accelerated additionally. This causes the maximum engine speed to be exceeded and is represented by drive A in FIG. 1.

In contrast, an optimum kick-down upshift is illustrated by curve B. In the latter case the shift takes place at the maximum engine speed but without exceeding it.

Figure 2:
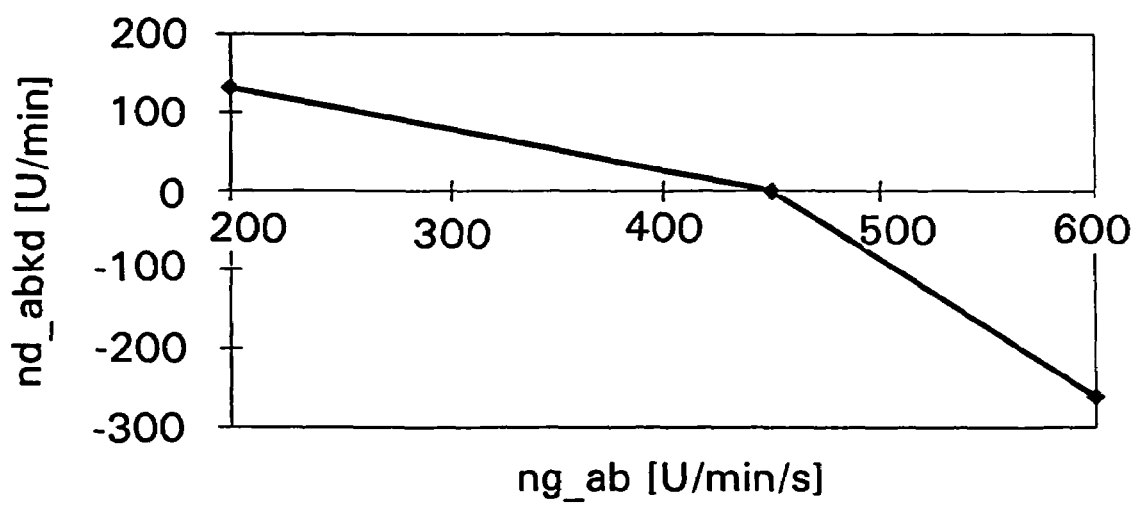
FIG. 2 is a representation of the speed offset as a function of the output speed gradient according to the invention.
Figure 3:
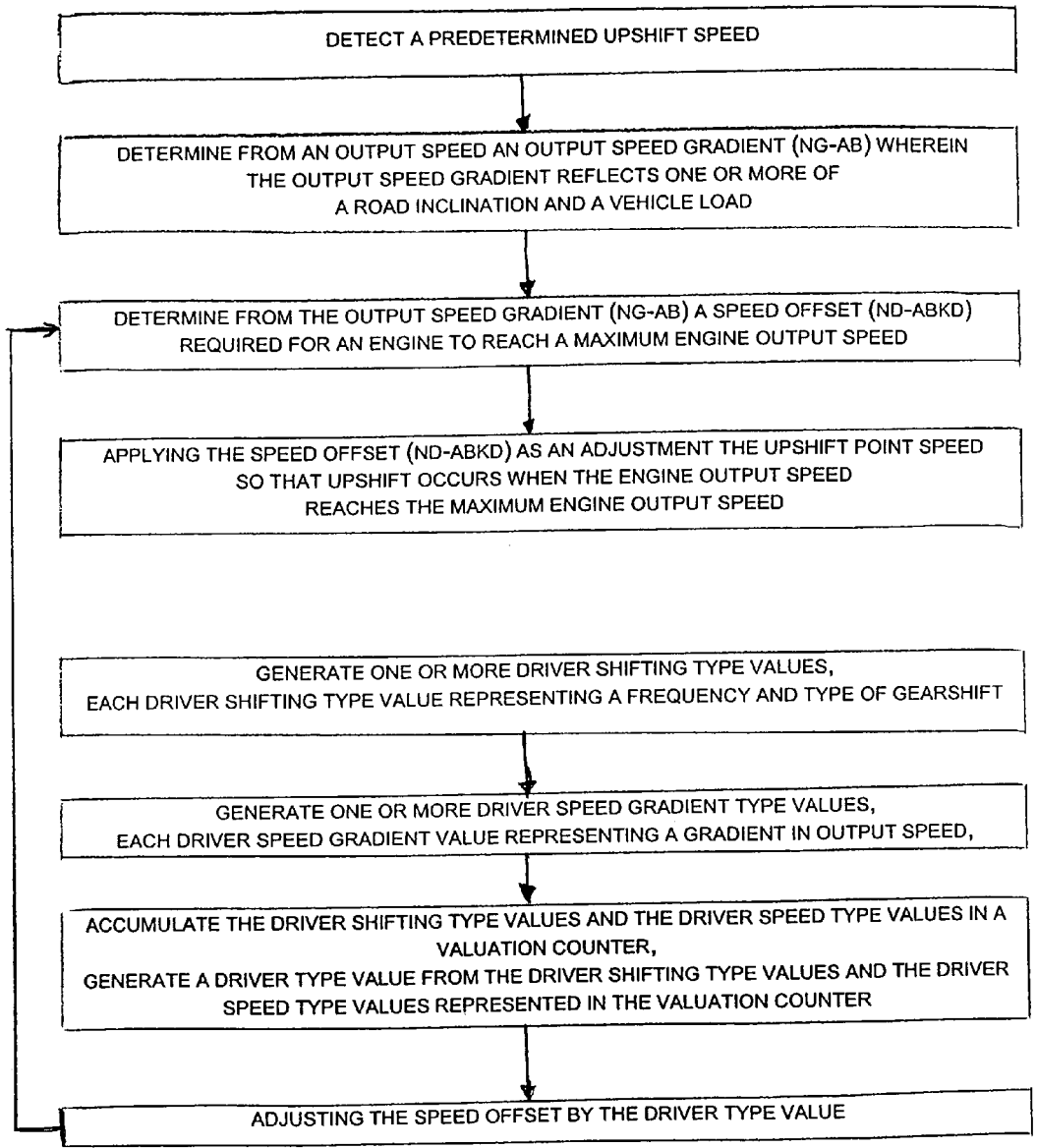
FIG. 3 is a flow diagram of the method of the present invention.

On the example of a gear upshift, FIG. 2 shows the engine speed offset according to the invention as a function of the output speed gradient ng_ab.

When a kick-down condition is recognized by the transmission control system, a speed offset nd_abkd of appropriate sign is added to the current upshift point.

On the example of the upswitch shown in FIG. 2, the value of the speed offset nd_abkd is equal to zero at a certain output speed gradient ng_ab (here for example 450 r/min per second). At a higher ng_ab value (for example, when driving downhill) the speed offset nd_abkd according to the invention will assume a negative value, i.e. the gear change will be triggered at a lower output speed.

In the case when the output speed gradient is smaller than a predetermined value, the speed offset nd_abkd is positive, i.e. the gear change takes place at a higher output speed value.

The variation of the speed offset of appropriate sign is stored in the transmission control system in the form of a characteristic line, and for each upshift X a separate characteristic line KL_ND_ABKDX is stored:

nd_abkdX=KL_ND_ABKDX [ng_ab]

By virtue of this procedure the kick-down upshift point is made adaptive, i.e. it is determined as a function of the respective load conditions and road inclinations, so that the gear change takes place at a desired maximum engine speed.

Alternatively, in variant of the present invention, instead of a speed offset an absolute kick-down switching characteristic line can be used.

According to a further variant of this invention, when a kick-down condition has been recognized the target gear of the next upshift and the transmission output speed gradient are determined.

Then, the speed offset nd_abkd is calculated. For this purpose, the delay times for the individual gear changes are stored for application. This procedure has the advantage that temperature-dependent delay times are taken into account when calculating the speed offset nd_abkd, as indicated by the following equation which shows an example of a possible calculation process:

nd_abkd=ng_ab*KW_TD_KDX[CGT] with CGT as the transmission temperature and KW_TD_KD as the characteristic line of delay times for individual gear changes.

For the adaptive kick-down upshift speed for a particular upshift X, this gives:

n_abkdX=KW_ND_ABKDX−nd_abkd.

The invention claimed is:

1. A method for optimizing a kick-down upshift point speed in a motor vehicle with an automatic transmission, comprising
   determining an engine output speed gradient at a kick-down upshift point wherein the engine output speed gradient reflects a road inclination;
   determining for the engine output speed gradient a speed offset representative of a time interval required for the engine output speed to reach a maximum engine output speed; and
   applying the speed offset as an adjustment to the upshift point speed.

2. The method according to claim 1, comprising adding a speed offset of appropriate sign (nd_abkd) to the current upshift point as a function of an output speed gradient (ng_ab) when a kick-down condition is recognized by a transmission control system of the transmission.

3. The method according to claim 2, comprising storing the variation of the speed offset of appropriate sign (nd_abkd) in a transmission control system in the form of a characteristic line a separate characteristic line being stored for each upshift.

4. The method according to claim 2, comprising determining a target gear for the next upshift when a kick-down condition is recognized and determining the transmission output speed gradient (ng_ab) and then calculating the speed offset (nd_abkd), delay times for individual gear changes being stored for application with temperature-dependent delay times being taken into account.

5. The method according to claim 2, comprising calculating the value of the speed offset (nd_abkd) and then recalculating this value as a function of an existing driver behavior, whereby an upshift speed (n_abkd) is adapted to driver's way of driving.

6. A method for kick-down upshift speed optimization in a motor vehicle with an automatic transmission, comprising:
   determining each kick-down upshift point as a function of an acceleration determined by a load condition and road inclination,
   adding a speed offset of appropriate sign (nd_abkd) to the current upshift point as a function of an output speed gradient (ng_ab) when a kick-down condition is recognized by a transmission control system of the transmission, by
   calculating a first value of the speed offset (nd_abkd),
   recalculating the first value of the speed offset (nd_abkd) as an intermediate value of the speed offset as a function of an existing driver behavior, whereby an upshift speed (n_abkd) is adapted to a driver's way of driving, and
   again recalculating the intermediate value of the speed offset (nd_abkd) as a final value of the speed offset as a function of driver activity by multiplying a characteristic line of the speed offset values (nd_abkd) by a factor that depends on driver behavior.

7. A method for a kick-down upshift speed optimization in a motor vehicle with an automatic transmission as a function of road inclination, comprising the steps of:
   determining at a kick-down point an output speed gradient (ng-ab) reflecting a road inclination;
   determining a speed offset (nd-abkd) dependent upon the output speed gradient (ng-ab) and representative of a time interval required for an engine output speed to reach a maximum engine output speed; and
   applying the speed offset (nd-abkd) as an adjustment to the upshift point speed such that the engine will reach the maximum engine output speed at an upshift point.

8. The method of claim 7, further comprising the step of further determining the output speed gradient (ng-ab) and the speed offset (nd-abkd) based upon a vehicle load condition which is derived from one of a corresponding curve and value stored in a transmission control system.

9. A method for kick-down upshift speed optimization in a motor vehicle with an automatic transmission as a function of road inclination, comprising the steps of:
   determining an output speed gradient (ng-ab) reflecting a road inclination,
   determining a speed offset (nd-abkd), dependent upon the output speed gradient (ng-ab), such that an engine will reach a maximum engine output speed at an upshift point, and
   altering the upshift speed according to the speed offset (nd-abkd) so that the upshift occurs at a time the engine output speed reaches the maximum engine output speed.

10. The method of claim 9, further comprising the step of further determining the output speed gradient (ng-ab) and the speed offset (nd-abkd) based upon a vehicle load condition which is derived from one of a corresponding curve and value stored in a transmission control system.

* * * * *